United States Patent
Wang et al.

(10) Patent No.: US 12,231,698 B2
(45) Date of Patent: Feb. 18, 2025

(54) FILTER PARAMETER SIGNALING IN VIDEO PICTURE HEADERS

(71) Applicant: Bytedance Inc., Los Angeles, CA (US)

(72) Inventors: Ye-kui Wang, San Diego, CA (US); Jizheng Xu, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 0 days.

(21) Appl. No.: 18/335,317

(22) Filed: Jun. 15, 2023

(65) Prior Publication Data
US 2023/0328294 A1   Oct. 12, 2023

Related U.S. Application Data

(63) Continuation of application No. 17/977,492, filed on Oct. 31, 2022, which is a continuation of application No. PCT/US2021/029416, filed on Apr. 27, 2021.
(Continued)

(51) Int. Cl.
*H04N 19/00* (2014.01)
*H04N 19/176* (2014.01)
(Continued)

(52) U.S. Cl.
CPC ......... *H04N 19/86* (2014.11); *H04N 19/176* (2014.11); *H04N 19/186* (2014.11); *H04N 19/70* (2014.11)

(58) Field of Classification Search
CPC .... H04N 19/86; H04N 19/176; H04N 19/186; H04N 19/70
See application file for complete search history.

(56) References Cited

U.S. PATENT DOCUMENTS 9,344,723 B2   5/2016   Van Der Auwera et al.
9,445,128 B2   9/2016   He
(Continued)

FOREIGN PATENT DOCUMENTS

KR   20220127351 A   9/2022
WO   2018175409 A1   9/2018
(Continued)

OTHER PUBLICATIONS

Document: JVET-R0078, Sun, H., et al., "AHG9: On signaling of deblocking parameters for coding monochrome pictures," Joint Video Experts Team (JVET) of ITU-T SG 16 WP 3 and ISO/IEC JTC 1/SC 29/WG 11 18th Meeting: by teleconference, Apr. 15-24, 2020, 6 pages.
(Continued)

*Primary Examiner* — Zhihan Zhou
(74) *Attorney, Agent, or Firm* — Conley Rose, P.C.

(57) ABSTRACT

Methods and apparatus for video processing are described. The video processing may include video encoding, video decoding, or video transcoding. One example video processing method includes performing a conversion between a video picture of a video and a bitstream of the video. A first syntax element in a first video unit level specifying a deblocking parameter offset for β divided by 2 applied to a chroma component for one or more slices in a first video unit and a second syntax element in the first video unit level specifying a deblocking parameter offset for tC divided by 2 applied to the chroma component for the one or more slices in the first video unit are determined according to a rule in response to the first syntax element and the second syntax element not included in the bitstream.

20 Claims, 7 Drawing Sheets

Related U.S. Application Data

(60) Provisional application No. 63/017,499, filed on Apr. 29, 2020.

(51) Int. Cl.
*H04N 19/186* (2014.01)
*H04N 19/70* (2014.01)
*H04N 19/86* (2014.01)

(56) References Cited

U.S. PATENT DOCUMENTS

| 9,538,200 | B2 | 1/2017 | Van Der Auwera et al. | |
|---|---|---|---|---|
| 11,997,318 | B2 | 5/2024 | Wang | |
| 2013/0272425 | A1 | 10/2013 | Van der Auwera | |
| 2021/0266550 | A1* | 8/2021 | Li | H04N 19/70 |
| 2021/0321138 | A1* | 10/2021 | Samuelsson | H04N 19/172 |
| 2022/0337829 | A1* | 10/2022 | Choi | H04N 19/117 |
| 2023/0022350 | A1* | 1/2023 | Paluri | H04N 19/46 |

FOREIGN PATENT DOCUMENTS

| WO | 2019188944 | A1 | 10/2019 |
|---|---|---|---|
| WO | 2021155740 | A1 | 8/2021 |
| WO | 2021167830 | A1 | 8/2021 |
| WO | 2021172471 | A1 | 9/2021 |
| WO | 2021201551 | A1 | 10/2021 |

OTHER PUBLICATIONS

Document: JVET-R0106-v1, Deshpande, S., et al., "On Deblocking Control," Joint Video Experts Team (JVET) of ITU-T SG 16 WP 3 and ISO/IEC JTC 1/SC 29/WG 11 18th Meeting: by teleconference, Apr. 15-24, 2020, 7 pages.
Document: JVET-R0172, Naser, K., et al., "AhG 9: Removed Redundant Coding of Chroma Deblocking Filter Parameters," Joint Video Experts Team (JVET) of ITU-T SG 16 WP 3 and ISO/IEC JTC 1/SC 29/WG 11 18th Meeting: by teleconference, Apr. 15-24, 2020, 6 pages.
Document: JVET-R2001-v3, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 528 pages.
"Series H: Audiovisual and Multimedia Systems Infrastructure of audiovisual services—Coding of moving video High efficiency video coding," ITU-T and ISO/IEC, Rec. ITU-T H.265 | ISO/IEC 23008-2 (in force edition), Feb. 2018, 692 pages.
Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-R2001-v1, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 519 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
Suehring, K., VTM software: https://vcgit.hhi.fraunhofer.de/jvet/VVCSoftware_VTM.git, Sep. 6, 2023, 3 pages.
Document: JVET-R0077-v1, Xu, J., et al., "Chroma deblocking parameters based on chroma coding tools," Joint Video Experts Team (JVET) of ITU-T SG 16 WP 3 and ISO/IEC JTC 1/SC 29/WG 11 18th Meeting: by teleconference, Apr. 15-24, 2020, 5 pages.
Document: JVET-R0172-r1, Naser, K., et al., "AhG9: Removed Redundant Coding of Chroma Deblocking Filter Parameters," Joint Video Experts Team (JVET) of ITU-T SG 16 WP 3 and ISO/IEC JTC 1/SC 29/WG 11 18th Meeting: by teleconference, Apr. 15-24, 2020, 11 pages.
Document: JVET-R0206-v1, Kotra, A., et al., "AHG9: Modified signalling of Chroma deblocking control parameters," Joint Video Experts Team (JVET) of ITU-T SG 16 WP 3 and ISO/IEC JTC 1/SC 29/WG 11 18th Meeting: by teleconference, Apr. 15-24, 2020, 11 pages.
Document: JVET-R0218, Unno, K., et al., "AHG9: Decoding conditions of deblocking control parameters for chroma," Joint Video Experts Team (JVET) of ITU-T SG 16 WP 3 and ISO/IEC JTC 1/SC 29/WG 11 18th Meeting: by teleconference, Apr. 15-24, 2020, 5 pages.
Document: JVET-R2001-v2, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 519 pages.
Document: JVET-R0081-v1, Zhang, Z., et al., "AHG9: Chroma deblocking strength signaling," Joint Video Experts Team (JVET) of ITU-T SG 16 WP 3 and ISO/IEC JTC 1/SC 29/WG 11 18th Meeting: by teleconference, Apr. 15-24, 2020, 9 pages.
Norkin, A., et al., "HEVC Deblocking Filter", IEEE Transactions on Circuits and Systems for Video Technology, IEEE, USA, vol. 22, No. 12, Dec. 1, 2012, pp. 1746-1754 ISSN: 1051-8215.
Foreign Communication From a Related Counterpart Application, European Application No. 21796181.2, Extended European Search Report dated Aug. 2, 2023, 13 pages.
Foreign Communication From a Related Counterpart Application, Indian Application No. 202227062009, Indian Office Action dated Jan. 19, 2023, 7 pages.
Notice of Allowance dated Mar. 15, 2023, 14 pages, U.S. Appl. No. 17/977,492, filed Oct. 31, 2022.
Foreign Communication From A Related Counterpart Application, PCT Application No. PCT/US2021/029416, International Search Report dated Jul. 28, 2021, 15 pages.
Technical Examination Report for Brazilian Application No. 112022021853-2, mailed Dec. 3, 2024, 12 pages.

\* cited by examiner

700 performing a conversion between a video picture of a video and a bitstream of the video, where a first syntax element in a first video unit level specifying a deblocking parameter offset for β divided by 2 applied to a chroma component for one or more slices in a first video unit and a second syntax element in the first video unit level specifying a deblocking parameter offset for tC divided by 2 applied to the chroma component for the one or more slices in the first video unit are determined according to a rule in response to the first syntax element and the second syntax element not included in the bitstream

FILTER PARAMETER SIGNALING IN VIDEO PICTURE HEADERS

CROSS REFERENCE TO RELATED APPLICATIONS

This application is a continuation of U.S. application Ser. No. 17/977,492, filed on Oct. 31, 2022, which is a continuation of International Patent Application No. PCT/US2021/029416 filed on Apr. 27, 2021, which claims priority to and benefits of U.S. Provisional Application No. U.S. 63/017,499 filed on Apr. 29, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses techniques that can be used by video encoders and decoders for processing coded representation of video using control information useful for decoding of the coded representation.

In one example aspect, a video processing method is disclosed. The method includes performing a conversion between a video picture of a video and a bitstream of the video. The conversion comprises performing a deblocking filtering operation in which at least some samples of reconstructed video blocks are selectively filtered using a deblocking filter whose parameters are indicated. A first syntax element in a first video unit level specifying a deblocking parameter offset for $\beta$ divided by 2 applied to a chroma component for one or more slices in a first video unit and a second syntax element in the first video unit level specifying a deblocking parameter offset for tC divided by 2 applied to the chroma component for the one or more slices in the first video unit are determined according to a rule in response to the first syntax element and the second syntax element not included in the bitstream. The rule specifies that (1) in case a syntax flag indicating that chroma tool offsets are present in a picture parameter set, the first syntax element is equal to a third syntax element in a second video unit level specifying a deblocking parameter offset for $\beta$ divided by 2 applied to a chroma component associated with a second video unit, and the second syntax element is equal to a fourth syntax element in the second video unit level specifying a deblocking parameter offset for tC divided by 2 applied to the chroma component associated with the second video unit, and (2) in case the syntax flag indicating that the chroma tool offsets are not present in the picture parameter set, the first syntax element is equal to a fifth syntax element in the first video unit level specifying a deblocking parameter offset for $\beta$ divided by 2 applied to a luma component for the one or more slices in the first video unit, and the second syntax element is equal to a sixth syntax element in the first video unit level specifying a deblocking parameter offset for tC divided by 2 applied to the luma component for the one or more slices in the first video unit.

In one example aspect, a video processing method is disclosed. The method includes performing a conversion between a video comprising one or more video blocks and a coded representation of the video, wherein the conversion comprises performing a deblocking filtering operation in which reconstructed video blocks are selectively filtered using a deblocking filter whose parameters are signaled in the coded representation according to a format rule, wherein the format rule includes an inference rule by which parameters of a deblocking filter used for a chroma component are inferred from the coded representation.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present disclosure.

BRIEF DESCRIPTION OF DRAWINGS

FIG. 7 is a flowchart representation of a method of video processing in accordance with the present technology.

DETAILED DESCRIPTION

Figure 1:
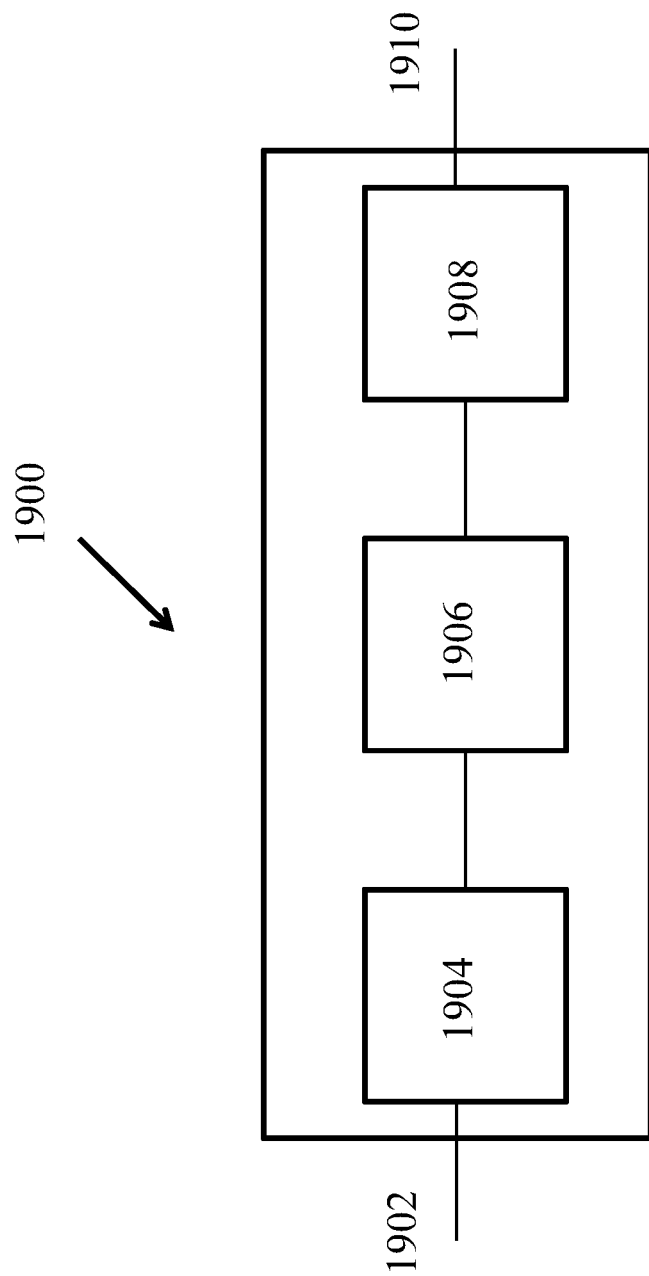
FIG. 1 is a block diagram of an example video processing system.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. OVERVIEW

This disclosure is related to video coding technologies. Specifically, it is about improvements on signalling of deblocking parameters. The ideas may be applied individually or in various combination, to any video coding standard or non-standard video codec that supports multi-layer video coding, e.g., the being-developed Versatile Video Coding (VVC).

2. ABBREVIATIONS

ALF Adaptive Loop Filter
APS Adaptation Parameter Set
AU Access Unit
AUD Access Unit Delimiter
AVC Advanced Video Coding
CB/Cb Blue Difference Chroma
CR/Cr Red Difference Chroma
CLVS Coded Layer Video Sequence
CPB Coded Picture Buffer
CRA Clean Random Access
CTB Coding Tree Block
CTU Coding Tree Unit
CU Coding Unit
CVS Coded Video Sequence
DCI Decoding Capability Information
DPB Decoded Picture Buffer
DU Decoding Unit
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
IRAP Intra Random Access Point
ISP Intra Sub-Partitions
JEM Joint Exploration Model
LMCS Luma Mapping with Chroma Scaling
LSB Least Significant Bits
MCTS Motion-Constrained Tile Sets
MSB Most Significant Bits
NAL Network Abstraction Layer
OLS Output Layer Set
PH Picture Header
POC Picture Order Count
PPS Picture Parameter Set
PTL Profile, Tier and Level
PU Picture Unit
QP Quantization Parameter
RADL Random Access Decodable Leading (Picture)
RAP Random Access Point
RASL Random Access Skipped Leading (Picture)
RBSP Raw Byte Sequence Payload
RPL Reference Picture List
RPS Reference Picture Set
SAO Sample Adaptive Offset
SBT Subblock Transform
SEI Supplemental Enhancement Information
SH Slice Header
SPS Sequence Parameter Set
STSA Step-wise Temporal Sublayer Access
SVC Scalable Video Coding
TU Transform Unit
VCL Video Coding Layer
VPS Video Parameter Set
VTM VVC Test Model
VUI Video Usability Information
VVC Versatile Video Coding
WPP Wavefront Parallel Processing
Y Luminance

3. INITIAL DISCUSSION

Video coding standards have evolved primarily through the development of the well-known International Telecommunication Union—Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEV standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.2. Slice Header and Picture Header in VVC

Similarly as in HEVC, the slice header in VVC conveys information for a particular slice. This includes slice address, slice type, slice QP, picture order count (POC) least significant bits (LSBs), RPS and RPL information, weighted prediction parameters, loop filtering parameters, entry offsets of tiles and WPP, etc.

VVC introduced the picture header (PH), which contains header parameters for a particular picture. Each picture must have one or only one PH. The PH basically carries those parameters that would have been in the slice header if PH were not introduced but each has the same value for all slices of a picture. These include IRAP/GDR picture indications, inter/intra slices allowed flags, POC LSB and optionally POC MSB, information on RPLs, deblocking, SAO, ALF, QP delta, and weighted prediction, coding block partitioning information, virtual boundaries, co-located picture information, etc. It often occurs that each picture in an entire sequence of pictures contains only one slice. To allow not to have at least two NAL units for each picture in such cases, the PH syntax structure is allowed to be included either the PH NAL unit or in the slice header.

In VVC, information on the collocated picture, which is used for temporal motion vector prediction, is signalled either in the picture header or the slice header.

3.3. Deblocking Filter in VVC

In VVC, the deblocking filter is applied to the samples adjacent to a CU, TU and subblock boundary except the case when the boundary is also a picture boundary, or when deblocking is disabled across slice, tile or subpicture boundaries (which is an option that can be signaled by the encoder). The deblocking filtering process is applied on a 4×4 grid for CU boundaries and transform subblock boundaries and on an 8×8 grid for prediction subblock boundaries. The prediction subblock boundaries include the prediction unit boundaries introduced by the Subblock-based Temporal Motion Vector Prediction (SbTMVP) and affine modes, and the transform subblock boundaries include the transform unit boundaries introduced by SBT and ISP modes, and transforms due to implicit split of large CUs. As done in HEVC, the processing order of the deblocking filter is defined as horizontal filtering for vertical edges for the entire picture first, followed by vertical filtering for horizontal edges. This specific order enables either multiple horizontal filtering or vertical filtering processes to be applied in parallel threads, or can still be implemented on a CTB-by-CTB basis with only a small processing latency.

VVC specifies the long deblocking filter. The filtering process are similar as that of HEVC. The boundary filter strength (bS) of the deblocking filter is controlled by the values of several syntax elements of the two adjacent blocks and according to the filter strength and the average quantization parameter of the adjacent blocks, two thresholds, tC and β, are determined from predefined tables. For luma samples, one of three four cases, no filtering, weak filtering, short strong filtering and long strong filtering is chosen based on β and block size. There are three cases, no filtering, normal filtering and strong filtering for chroma samples. Compared to HEVC, the long strong filtering for luma samples and strong filtering for chroma samples are newly introduced in VVC. Long luma strong filtering is used when samples at either one side of a boundary belong to a large block. A sample belonging to a large block is defined as when the width is larger than or equal to 32 for a vertical edge, or when height is larger than or equal to 32 for a horizontal edge. Up to 7 samples at one side of a boundary are filtered in the strong filter. Strong chroma filtering is applied when both sides of the chroma edge are greater than or equal to 8 (in unit of chroma sample) and 3 chroma samples from each side are filtered.

The luma-adaptive deblocking in VVC further adjusts tC and β of deblocking filter based on the averaged luma level of the reconstructed samples. When luma-adaptive deblocking is enabled, an offset qpOffset, which is derived based on the averaged luma level around the filtering boundary, is added to the average quantization parameters of the two adjacent blocks. The mapping function of qpOffset and luma level should be derived according to the transfer characteristics (Electro-Optical Transfer Function (EOTF) and Opto-Optical Transfer Function (OOTF)) of the video contents and are signaled in SPS.

3.4. Deblocking Signalling in VVC

The deblocking signalling in some embodiments is defined as follows.

7.3.2.4 Picture Parameter Set RBSP Syntax

| | Descriptor |
|---|---|
| pic_parameter_set_rbsp( ) { | |
| ... | |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_no_pic_partition_flag && | |
|     deblocking_filter_override_enabled_flag ) | |
|       dbf_info_in_ph_flag | u(1) |
|     if( !pps_deblocking_filter_disabled_flag ) { | |
|       pps_luma_beta_offset_div2 | se(v) |
|       pps_luma_tc_offset_div2 | se(v) |
|       if( pps_chroma_tool_offsets_present_flag ) { | |
|         pps_cb_beta_offset_div2 | se(v) |
|         pps_cb_tc_offset_div2 | se(v) |
|         pps_cr_beta_offset_div2 | se(v) |
|         pps_cr_tc_offset_div2 | se(v) |
|       } | |
|     } | |
|   } | |
| ... | |
| } | |

7.4.3.4 Picture Parameter Set RBSP Semantics

...

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS and that the deblocking filter is applied for all slices referring to the PPS, using 0-valued deblocking β and $t_C$ offsets.

deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS for which one of the following two conditions is true: 1) ph_deblockig_filter_disabled_flag and slice_deblocking_filter_disabled_flag are not present and 2) ph_deblockig_filter_disabled_flag or slice_deblocking_filter_disabled_flag is present and equal to 1, and also specifies that the operation of deblocking filter is applied for slices referring to the PPS for which ph_deblockig_filter_disabled_flag or slice_deblocking_filter_disabled_flag is present and equal to 0.

pps_deblocking_filter_disabled_flag equal to 0 specifies that the operation of the deblocking filter is applied for slices referring to the PPS for which one of the following two conditions is true: 1) ph_deblockig_filter_disabled_flag and slice_deblocking_filter_disabled_flag are not present and 2) ph_deblockig_filter_disabled_flag or slice_deblocking_filter_disabled_flag is present and equal to 0, and also specifies that the operation of deblocking filter is not applied for slices referring to the PPS for which ph_deblockig_filter_disabled_flag or slice_deblocking_filter_disabled_flag is present and equal to 1.

When not present, the value of pps_deblocking_filter_disabled_flag is inferred to be equal to 0.

dbf_info_in_ph_flag equal to 1 specifies that deblocking filter information is present in the PH syntax structure and not present in slice headers referring to the PPS that do not contain a PH syntax structure. dbf_info_in_ph_flag equal to 0 specifies that deblocking filter information is not present in the PH syntax structure and may be present in slice headers referring to the PPS. When not present, the value of dbf_info_in_ph_flag is inferred to be equal to 0.

pps_luma_beta_offset_div 2 and pps_luma_tc_offset_div 2 specify the default deblocking parameter offsets for and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_luma_beta_offset_div 2 and pps_luma_tc_offset_div 2 shall both be in the range of −12 to 12, inclusive. When not present, the values of pps_luma_beta_offset_div 2 and pps_luma_tc_offset_div 2 are both inferred to be equal to 0.

pps_cb_beta_offset_div 2 and pps_cb_tc_offset_div 2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div 2 and pps_cb_tc_offset_div 2 shall both be in the range of −12 to 12, inclusive. When not present, the values of pps_cb_beta_offset_div 2 and pps_cb_tc_offset_div 2 are inferred to be equal to pps_luma_beta_offset_div 2 and pps_luma_tc_offset_div 2, respectively.

pps_cr_beta_offset_div 2 and pps_cr_tc_offset_div 2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div 2 and pps_cr_tc_offset_div 2 shall both be in the range of −12 to 12, inclusive. When not present, the values of pps_cr_beta_offset_div 2 and pps_cr_tc_offset_div 2 are inferred to be equal to pps_luma_beta_offset_div 2 and pps_luma_tc_offset_div 2, respectively.

. . .

7.3.2.7 Picture Header Structure Syntax

| | Descriptor |
|---|---|
| picture_header_structure( ) { | |
| ... | |
|   if( deblocking_filter_override_enabled_flag && | |
|     dbf_info_in_ph_flag ) { | |
|     ph_deblocking_filter_override_flag | u(1) |
|     if( ph_deblocking_filter_override_flag ) { | |
|       if( !pps_deblocking_filter_disabled_flag ) | |
|       ph_deblocking_filter_disabled_flag | u(1) |
|       if( !ph_deblocking_filter_disabled_flag ) { | |
|         ph_luma_beta_offset_div2 | se(v) |
|         ph_luma_tc_offset_div2 | se(v) |
|         if( pps_chroma_tool_offsets_present_flag ) { | |
|           ph_cb_beta_offset_div2 | se(v) |
|           ph_cb_tc_offset_div2 | se(v) |
|           ph_cr_beta_offset_div2 | se(v) |
|           ph_cr_tc_offset_div2 | se(v) |
|         } | |
|       } | |
|     } | |
|   } | |
| ... | |
| } | |

7.4.3.7 Picture Header Structure Semantics ph_deblocking_filter_override_flag equal to 1 specifies that deblocking parameters are present in the PH. ph_deblocking_filter_override_flag equal to 0 specifies that deblocking parameters are not present in the PH. When not present, the value of ph_deblocking_filter_override_flag is inferred to be equal to 0.

ph_deblocking_filter_disabled_flag equal to 1 specifies that the operation of the deblocking filter is not applied for the slices associated with the PH for which slice_deblocking_filter_disabled_flag is not present in the SHs and inferred to be equal to 1 or is present in the SHs and equal to 1, and also specifies that the operation of the deblocking filter is applied for the slices associated with the PH for which slice_deblocking_filter_disabled_flag is not present in the SHs and inferred to be equal to 0 or is present in the SHs and equal to 0.

ph_deblocking_filter_disabled_flag equal to 0 specifies that the operation of the deblocking filter is applied for the slices associated with the PH for which slice_deblocking_filter_disabled_flag is not present in the SHs and inferred to be equal to 0 or is present in the SHs and equal to 0, and also specifies that the operation of the deblocking filter is not applied for the slices associated with the PH for which slice_deblocking_filter_disabled_flag is not present in the SHs and inferred to be equal to 1 or is present in the SHs and equal to 1.

When ph_deblocking_filter_disabled_flag is not present, it is inferred as follows:
    If pps_deblocking_filter_disabled_flag and ph_deblocking_filter_override_flag are both equal to 1, the value of ph_deblocking_filter_disabled_flag is inferred to be equal to 0.
    Otherwise (pps_deblocking_filter_disabled_flag or ph_deblocking_filter_override_flag is equal to 0), the value of ph_deblocking_filter_disabled_flag is inferred to be equal to pps_deblocking_filter_disabled_flag.

ph_luma_beta_offset_div 2 and ph_luma_tc_offset_div 2 specify the deblocking parameter offsets for β and tC (divided by 2) that are applied to the luma component for the slices associated with the PH. The values of ph_luma_beta_offset_div 2 and ph_luma_tc_offset_div 2 shall both be in the range of −12 to 12, inclusive. When not present, the values of ph_luma_beta_offset_div 2 and ph_luma_tc_offset_div 2 are inferred to be equal to pps_luma_beta_offset_div 2 and pps_luma_tc_offset_div 2, respectively.

ph_cb_beta_offset_div 2 and ph_cb_tc_offset_div 2 specify the deblocking parameter offsets for β and tC (divided by 2) that are applied to the Cb component for the slices associated with the PH. The values of ph_cb_beta_offset_div 2 and ph_cb_tc_offset_div 2 shall both be in the range of −12 to 12, inclusive. When not present, the values of ph_cb_beta_offset_div 2 and ph_cb_tc_offset_div 2 are inferred to be equal to ph_luma_beta_offset_div 2 and ph_luma_tc_offset_div 2, respectively.

ph_cr_beta_offset_div 2 and ph_cr_tc_offset_div 2 specify the deblocking parameter offsets for β and tC (divided by 2) that are applied to the Cr component for the slices associated with the PH. The values of ph_cr_beta_offset_div 2 and ph_cr_tc_offset_div 2 shall both be in the range of −12 to 12, inclusive. When not present, the values of ph_cr_beta_offset_div 2 and ph_cr_tc_offset_div 2 are inferred to be equal to ph_luma_beta_offset_div 2 and ph_luma_tc_offset_div 2, respectively.
. . .
7.3.7.1 General Slice Header Syntax

| | Descriptor |
|---|---|
| slice_header( ) { | |
| ... | |
|   if( deblocking_filter_override_enabled_flag && | |
|     !dbf_info_in_ph_flag ) | |
|     slice_deblocking_filter_override_flag | u(1) |
|   if( slice_deblocking_filter_override_flag ) { | |
|     if( !pps_deblocking_filter_disabled_flag ) | |
|       slice_deblocking_filter_disabled_flag | u(1) |
|     if( !slice_deblocking_filter_disabled_flag ) { | |
|       slice_luma_beta_offset_div2 | se(v) |
|       slice_luma_tc_offset_div2 | se(v) |
|       if( pps_chroma_tool_offsets_present_flag ) { | |
|         slice_cb_beta_offset_div2 | se(v) |
|         slice_cb_tc_offset_div2 | se(v) |
|         slice_cr_beta_offset_div2 | se(v) |
|         slice_cr_tc_offset_div2 | se(v) |
|       } | |
|     } | |
|   } | |
| ... | |
| } | |

7.4.8.1 General Slice Header Semantics
slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to 0.
slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice.
When slice_deblocking_filter_disabled_flag is not present, it is inferred as follows:
  If pps_deblocking_filter_disabled_flag and slice_deblocking_filter_override_flag are both equal to 1, the value of slice_deblocking_filter_disabled_flag is inferred to be equal to 0.
  Otherwise (pps_deblocking_filter_disabled_flag or slice_deblocking_filter_override_flag is equal to 0), the value of slice_deblocking_filter_disabled_flag is inferred to be equal to ph_deblocking_filter_disabled_flag.
slice_luma_beta_offset_div 2 and slice_luma_tc_offset_div 2 specify the deblocking parameter offsets for β and tC (divided by 2) that are applied to the luma component for the current slice. The values of slice_luma_beta_offset_div 2 and slice_luma_tc_offset_div 2 shall both be in the range of −12 to 12, inclusive. When not present, the values of slice_luma_beta_offset_div 2 and slice_luma_tc_offset_div 2 are inferred to be equal to ph_luma_beta_offset_div 2 and ph_luma_tc_offset_div 2, respectively.
slice_cb_beta_offset_div 2 and slice_cb_tc_offset_div 2 specify the deblocking parameter offsets for β and tC (divided by 2) that are applied to the Cb component for the current slice. The values of slice_cb_beta_offset_div 2 and slice_cb_tc_offset_div 2 shall both be in the range of −12 to 12, inclusive. When not present, the values of slice_cb_beta_offset_div 2 and slice_cb_tc_offset_div 2 are inferred to be equal to slice_luma_beta_offset_div 2 and slice_luma_tc_offset_div 2, respectively.
slice_cb_beta_offset_div 2 and slice_cb_tc_offset_div 2 specify the deblocking parameter offsets for β and tC (divided by 2) that are applied to the Cr component for the current slice. The values of slice_cr_beta_offset_div 2 and slice_cr_tc_offset_div 2 shall both be in the range of −12 to 12, inclusive. When not present, the values of slice_cr_beta_offset_div 2 and slice_cr_tc_offset_div 2 are inferred to be equal to slice_luma_beta_offset_div 2 and slice_luma_tc_offset_div 2, respectively.

4. TECHNICAL PROBLEMS SOLVED BY DISCLOSED TECHNICAL SOLUTIONS AND EMBODIMENTS

The existing design in some implementations has the following problems:
1) The inferences of ph_cb_beta_offset_div 2 and ph_cb_tc_offset_div 2 when not present make the values of pps_cb_beta_offset_div 2 and pps_cb_tc_offset_div 2 useless.
2) The inferences of ph_cr_beta_offset_div 2 and ph_cr_tc_offset_div 2 when not present make the values of pps_cr_beta_offset_div 2 and pps_cr_tc_offset_div 2 useless.
3) The inferences of slice_cb_beta_offset_div 2 and slice_cb_tc_offset_div 2 when not present make the values of ph_cb_beta_offset_div 2 and ph_cb_tc_offset_div 2 useless.
4) The inferences of slice_cr_beta_offset_div 2 and slice_cr_tc_offset_div 2 when not present make the values of ph_cr_beta_offset_div 2 and ph_cr_tc_offset_div 2 useless.

5. A LISTING OF SOLUTIONS AND EMBODIMENTS

To solve the above problems, and others, methods as summarized below are disclosed. The embodiments should be considered as examples to explain the general concepts and should not be interpreted in a narrow way. Furthermore, these embodiments can be applied individually or combined in any manner.
1) To solve problem 1, the inferences of ph_cb_beta_offset_div 2 and ph_cb_tc_offset_div 2 when not present are changed to be as follows:
  When not present, the values of ph_cb_beta_offset_div 2 and ph_cb_tc_offset_div 2 are inferred as follows. If pps_chroma_tool_offsets_present_flag is equal to 0, ph_cb_beta_offset_div 2 and ph_cb_tc_offset_div 2 are inferred to be equal to ph_luma_beta_offset_div 2 and ph_luma_tc_offset_div 2, respectively. Otherwise, ph_cb_beta_offset_div 2 and ph_cb_tc_offset_div 2 are inferred to be equal to pps_cb_beta_offset_div 2 and pps_cb_tc_offset_div 2, respectively.
2) To solve problem 2, the inferences of ph_cr_beta_offset_div 2 and ph_cr_tc_offset_div 2 when not present are changed to be as follows:
  When not present, the values of ph_cr_beta_offset_div 2 and ph_cr_tc_offset_div 2 are inferred as follows. If pps_chroma_tool_offsets_present_flag is equal to 0, ph_cr_beta_offset_div 2 and ph_cr_tc_offset_div 2 are inferred to be equal to ph_luma_beta_offset_div 2 and ph_luma_tc_offset_div 2, respectively. Otherwise, ph_cr_beta_offset_div 2 and ph_cr_t- c_offset_div 2 are inferred to be equal to pps_cr_beta_offset_div 2 and pps_cr_tc_offset_div 2, respectively.
3) To solve problem 3, inferences of slice_cb_beta_offset_div 2 and slice_cb_tc_offset_div 2 when not present are changed to be as follows:
When not present, the values of slice_cb_beta_offset_div 2 and slice_cb_tc_offset_div 2 are inferred as follows. If pps_chroma_tool_offsets_present_flag is equal to 0, slice_cb_beta_offset_div 2 and slice_cb_tc_offset_div 2 are inferred to be equal to slice_luma_beta_offset_div 2 and slice_luma_tc_offset_div 2, respectively. Otherwise, slice_cb_beta_offset_div 2 and slice_cb_tc_offset_div 2 are inferred to be equal to ph_cb_beta_offset_div 2 and ph_cb_tc_offset_div 2, respectively.
4) To solve problem 4, inferences of slice_cr_beta_offset_div 2 and slice_cr_tc_offset_div 2 when not present are changed to be as follows:
When not present, the values of slice_cr_beta_offset_div 2 and slice_cr_tc_offset_div 2 are inferred as follows. If pps_chroma_tool_offsets_present_flag is equal to 0, slice_cr_beta_offset_div 2 and slice_cr_tc_offset_div 2 are inferred to be equal to slice_luma_beta_offset_div 2 and slice_luma_tc_offset_div 2, respectively. Otherwise, slice_cr_beta_offset_div 2 and slice_cr_tc_offset_div 2 are inferred to be equal to ph_cr_beta_offset_div 2 and ph_cr_tc_offset_div 2, respectively.

6. EMBODIMENTS

Below are some example embodiments for some of the aspects summarized above in Section 5, which can be applied to the VVC specification. Most relevant parts that have been added or modified are underlined in *boldface italics*, and some of the deleted parts are indicated using [[ ]].

6.1. First Embodiment

This embodiment is for items 1, 2, 3, and 4.
7.4.3.7 Picture Header Structure Semantics
ph_deblocking_filter_override_flag equal to 1 specifies that deblocking parameters are present in the PH. ph_deblocking_filter_override_flag equal to 0 specifies that deblocking parameters are not present in the PH. When not present, the value of ph_deblocking_filter_override_flag is inferred to be equal to 0.
ph_deblocking_filter_disabled_flag equal to 1 specifies that the operation of the deblocking filter is not applied for the slices associated with the PH for which slice_deblocking_filter_disabled_flag is not present in the SHs and inferred to be equal to 1 or is present in the SHs and equal to 1, and also specifies that the operation of the deblocking filter is applied for the slices associated with the PH for which slice_deblocking_filter_disabled_flag is not present in the SHs and inferred to be equal to 0 or is present in the SHs and equal to 0.
ph_deblocking_filter_disabled_flag equal to 0 specifies that the operation of the deblocking filter is applied for the slices associated with the PH for which slice_deblocking_filter_disabled_flag is not present in the SHs and inferred to be equal to 0 or is present in the SHs and equal to 0, and also specifies that the operation of the deblocking filter is not applied for the slices associated with the PH for which slice_deblocking_filter_disabled_flag is not present in the SHs and inferred to be equal to 1 or is present in the SHs and equal to 1.
When ph_deblocking_filter_disabled_flag is not present, it is inferred as follows:
If pps_deblocking_filter_disabled_flag and ph_deblocking_filter_override_flag are both equal to 1, the value of ph_deblocking_filter_disabled_flag is inferred to be equal to 0.
Otherwise (pps_deblocking_filter_disabled_flag or ph_deblocking_filter_override_flag is equal to 0), the value of ph_deblocking_filter_disabled_flag is inferred to be equal to pps_deblocking_filter_disabled_flag.
ph_luma_beta_offset_div 2 and ph_luma_tc_offset_div 2 specify the deblocking parameter offsets for β and tC (divided by 2) that are applied to the luma component for the slices associated with the PH. The values of ph_luma_beta_offset_div 2 and ph_luma_tc_offset_div 2 shall both be in the range of −12 to 12, inclusive. When not present, the values of ph_luma_beta_offset_div 2 and ph_luma_tc_offset_div 2 are inferred to be equal to pps_luma_beta_offset_div 2 and pps_luma_tc_offset_div 2, respectively.
ph_cb_beta_offset_div 2 and ph_cb_tc_offset_div 2 specify the deblocking parameter offsets for β and tC (divided by 2) that are applied to the Cb component for the slices associated with the PH. The values of ph_cb_beta_offset_div 2 and ph_cb_tc_offset_div 2 shall both be in the range of −12 to 12, inclusive.
*When not present, the values of ph_cb_beta_offset_div2 and ph_cb_tc_offset_div2 are inferred as follows. If pps_chroma_tool_offsets_present_flag is equal to 0, ph_cb_beta_offset_div2 and ph_cb_tc_offset_div2 are inferred to be equal to ph_luma_beta_offset_div2 and ph_luma_tc_offset_div2, respectively. Otherwise, ph_cb_beta_offset_div2 and ph_cb_tc_offset_div2 are inferred to be equal to pps_cb_beta_offset_div2 and pps_cb_tc_offset_div2, respectively.*
ph_cr_beta_offset_div 2 and ph_cr_tc_offset_div 2 specify the deblocking parameter offsets for β and tC (divided by 2) that are applied to the Cr component for the slices associated with the PH. The values of ph_cr_beta_offset_div 2 and ph_cr_tc_offset_div 2 shall both be in the range of −12 to 12, inclusive.
*When not present, the values of ph_cr_beta_offset_div2 and ph_cr_tc_offset_div2 are inferred as follows. If pps_chroma_tool_offsets_present_flag is equal to 0, ph_cr_beta_offset_div2 and ph_cr_tc_offset_div2 are inferred to be equal to ph_luma_beta_offset_div2 and ph_luma_tc_offset_div2, respectively. Otherwise, ph_cr_beta_offset_div2 and ph_cr_tc_offset_div2 are inferred to be equal to pps_cr_beta_offset_div2 and pps_cr_tc_offset_div2, respectively.*
. . .
7.4.8.1 General Slice Header Semantics
. . .
slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to 0.
slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice.

When slice_deblocking_filter_disabled_flag is not present, it is inferred as follows:

If pps_deblocking_filter_disabled_flag and slice_deblocking_filter_override_flag are both equal to 1, the value of slice_deblocking_filter_disabled_flag is inferred to be equal to 0.

Otherwise (pps_deblocking_filter_disabled_flag or slice_deblocking_filter_override_flag is equal to 0), the value of slice_deblocking_filter_disabled_flag is inferred to be equal to ph_deblocking_filter_disabled_flag.

slice_luma_beta_offset_div 2 and slice_luma_tc_offset_div 2 specify the deblocking parameter offsets for β and tC (divided by 2) that are applied to the luma component for the current slice. The values of slice_luma_beta_offset_div 2 and slice_luma_tc_offset_div 2 shall both be in the range of −12 to 12, inclusive. When not present, the values of slice_luma_beta_offset_div 2 and slice_luma_tc_offset_div 2 are inferred to be equal to ph_luma_beta_offset_div 2 and ph_luma_tc_offset_div 2, respectively.

slice_cb_beta_offset_div 2 and slice_cb_tc_offset_div 2 specify the deblocking parameter offsets for β and tC (divided by 2) that are applied to the Cb component for the current slice. The values of slice_cb_beta_offset_div 2 and slice_cb_tc_offset_div 2 shall both be in the range of −12 to 12, inclusive.

*When not present, the values of slice_cb_beta_offset_div2 and slice_cb_tc_offset_div2 are inferred as follows. If pps_chroma_tool_offsets_present_flag is equal to 0, slice_cb_ beta_offset_div2 and slice_cb_tc_offset_div2 are inferred to be equal to slice_luma_beta_offset_div2 and slice _luma_tc_offset_div2, respectively. Otherwise, slice_cb_beta_offset_div2 and slice_cb_tc_offset_div2 are inferred to be equal to ph_cb_beta_offset_div2 and ph_cb_tc_offset_div2, respectively.* slice_cb_beta_offset_div 2 and slice_cb_tc_offset_div 2 specify the deblocking parameter offsets for β and tC (divided by 2) that are applied to the Cr component for the current slice. The values of slice_cr_beta_offset_div 2 and slice_cr_tc_offset_div 2 shall both be in the range of −12 to 12, inclusive.

*When not present, the values of slice_cr_beta_offset_div2 and slice_cr_tc_offset_div2 are inferred as follows. If pps_chroma_tool_offsets_present_flag is equal to 0, slice _cr_beta_offset_div2 and slice_cr_tc_offset_div2 are inferred to be equal to slice_ luma_beta_offset_div2 and slice_luma_tc_offset_div2, respectively. Otherwise, slice_cr_beta_offset_div2 and slice_cr_tc_offset_div2 are inferred to be equal to ph _cr_beta_offset_div2 and ph_cr_tc_offset_div2, respectively.*

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wireless Fidelity (Wi-Fi) or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 2:
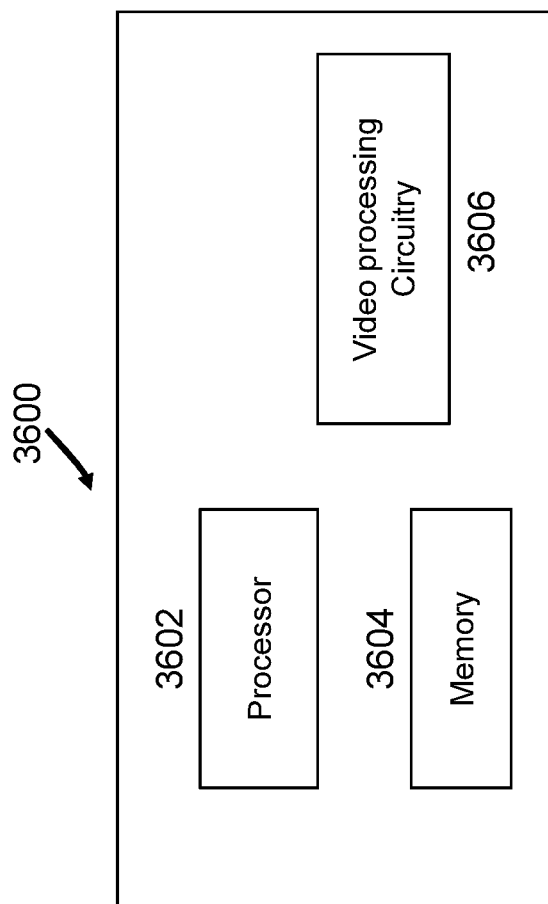
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and techniques described herein. The video processing hardware 3606 may be used to implement, in hardware circuitry, some techniques described in the present disclosure.

Figure 4:
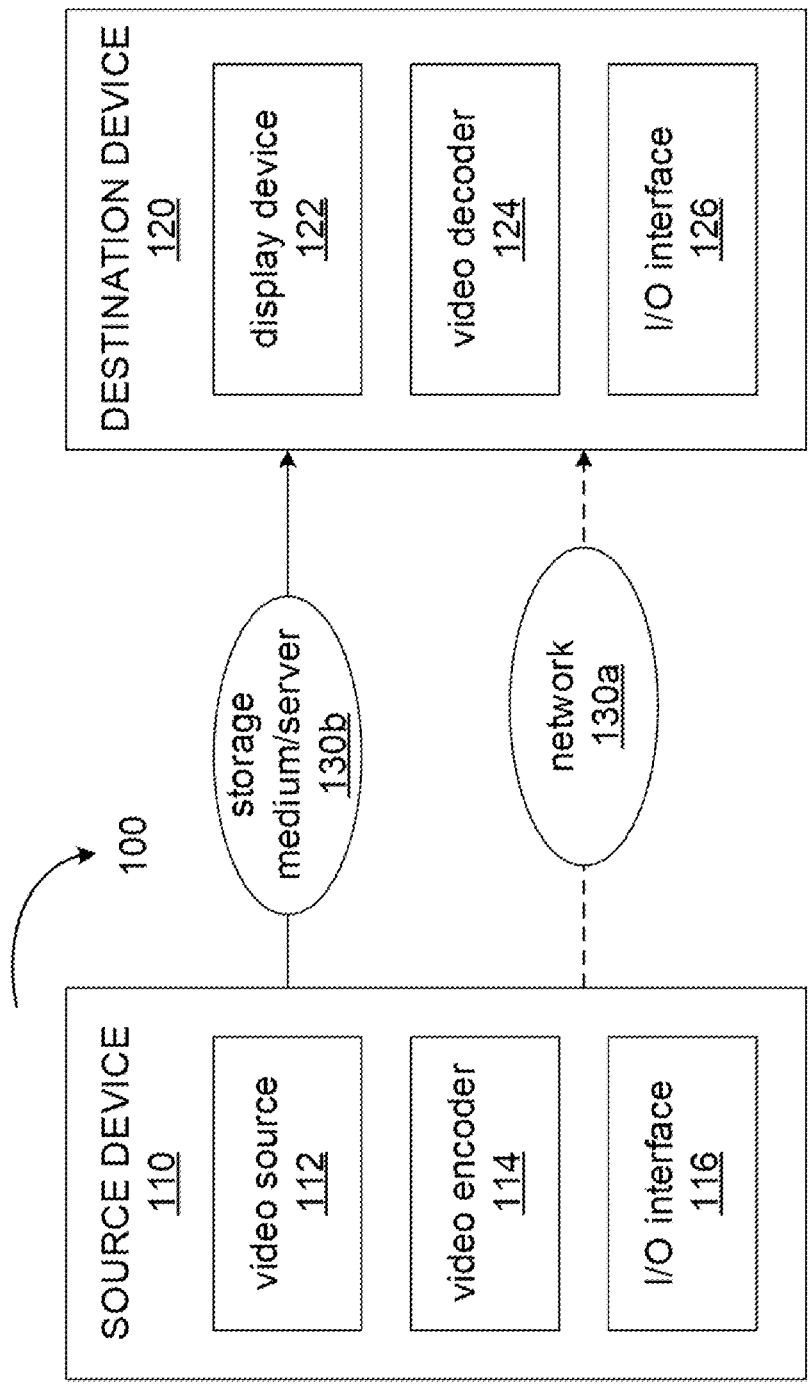
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources.

The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
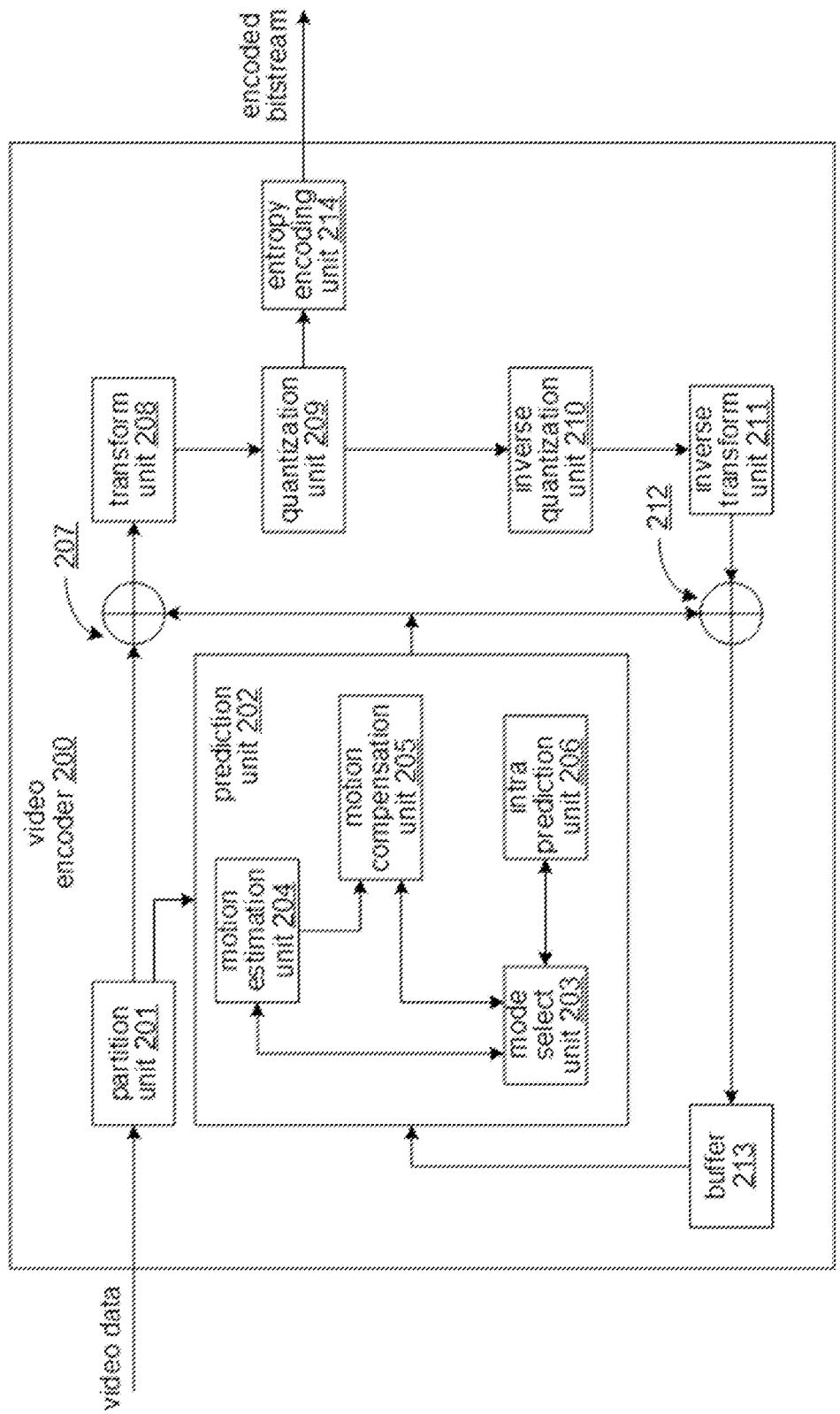
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
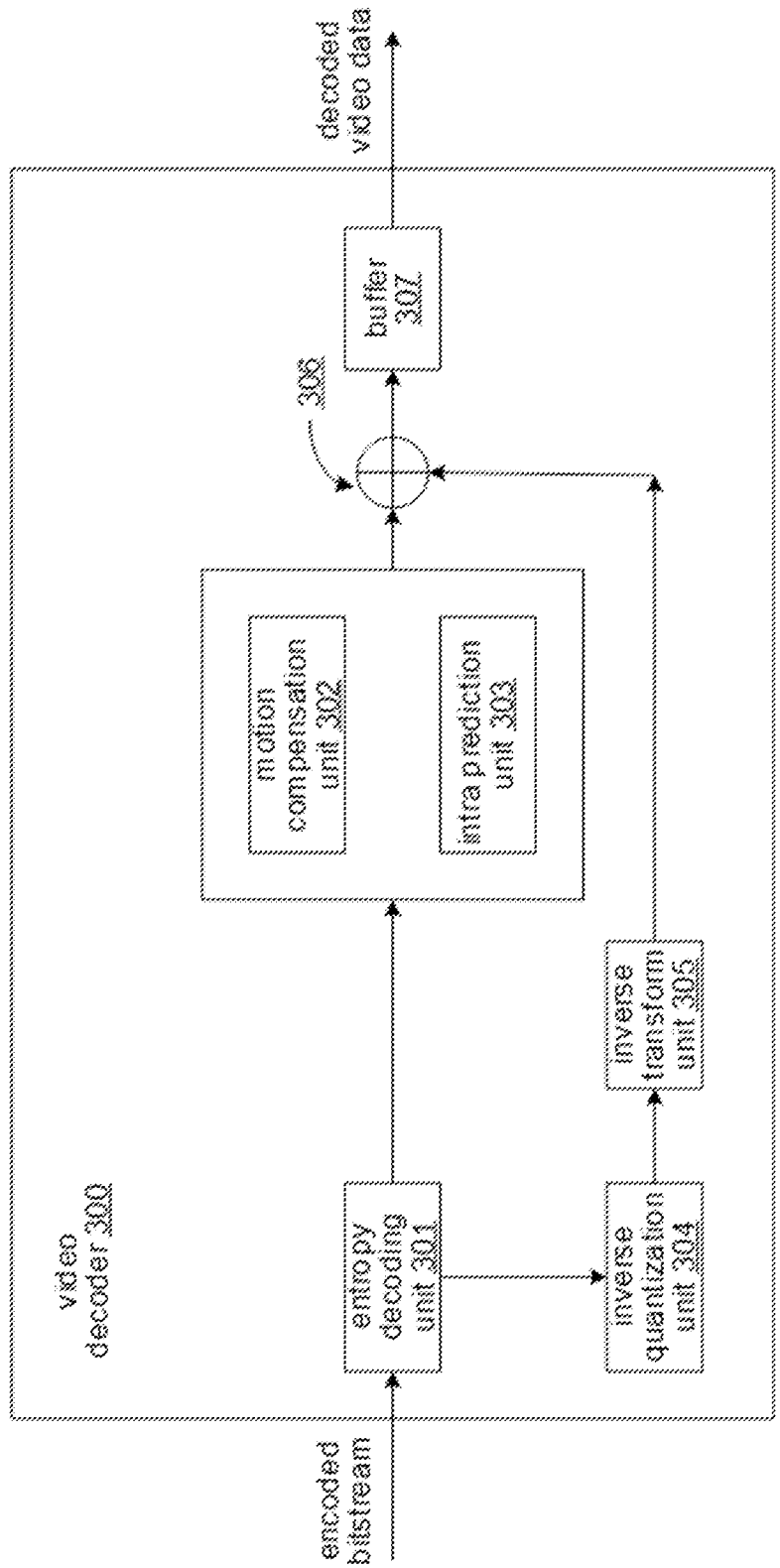
FIG. 6 is a block diagram that illustrates a decoder in accordance with some embodiments of the present disclosure.

FIG. 6 is a block diagram illustrating an example of video decoder 300 which may be video decoder 124 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments of techniques discussed in the previous section (e.g., items 1-4).

Figure 3:
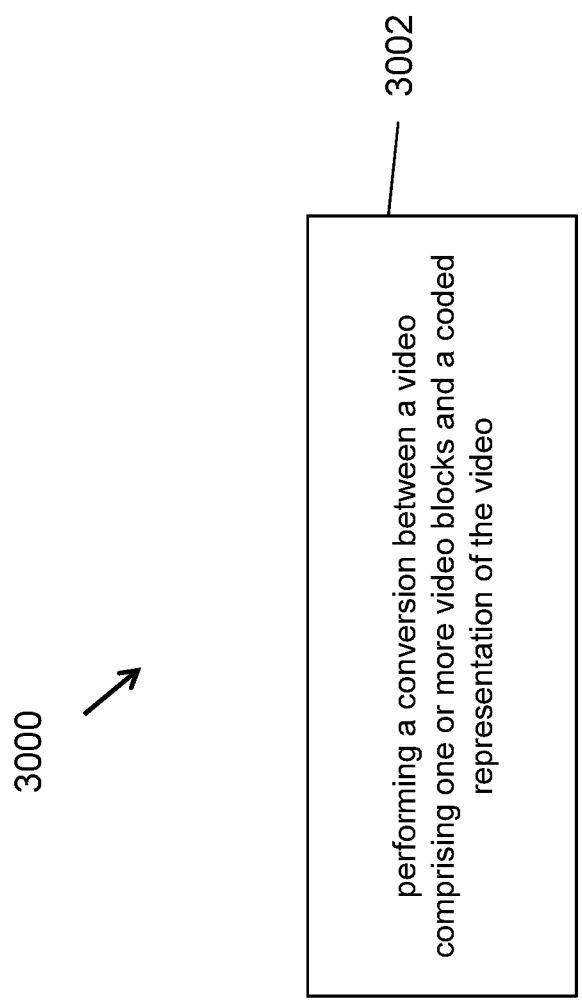
FIG. 3 is a flowchart for an example method of video processing.

1. A video processing method (e.g., method 3000 shown in FIG. 3), comprising performing (3002) a conversion between a video comprising one or more video blocks and a coded representation of the video; wherein the conversion comprises performing a deblocking filtering operation in which reconstructed video blocks are selectively filtered using a deblocking filter whose parameters are signaled in the coded representation according to a format rule, wherein the format rule includes an inference rule by which parameters of a deblocking filter used for a chroma component are inferred from the coded representation.
2. The method of solution 1, wherein the chroma component in a cr component.
3. The method of any of solutions 1-2, wherein the chroma component is a cb component.
4. The method of any of solutions 1-3, wherein the inference rule specifies that a beta parameter for the deblocking filter and an offset parameter for the deblocking filter are inferred based on a value of a flag included in the coded representation.
5. The method of solution 4, wherein the inference rule specifies that, for a first value of the flag, the beta parameter and the offset parameter are inferred to be zero.
6. The method of any of solutions 4-5, wherein the inference rule specifies that, for a second value of the flag, the beta parameter and the offset parameter are derived from beta and offset parameters for a corresponding luma block.
7. The method of any of solutions 1 to 6, wherein the conversion comprises encoding the video into the coded representation.
8. The method of any of solutions 1 to 6, wherein the conversion comprises decoding the coded representation to generate pixel values of the video.
9. A video decoding apparatus comprising a processor configured to implement a method recited in one or more of solutions 1 to 8.
10. A video encoding apparatus comprising a processor configured to implement a method recited in one or more of solutions 1 to 8.
11. A computer program product having computer code stored thereon, the code, when executed by a processor, causes the processor to implement a method recited in any of solutions 1 to 8.
12. A method, apparatus or system described in the present disclosure.

FIG. 7 is a flowchart representation of a method 700 of video processing in accordance with the present technology. The method 700 includes, at operation 710, performing a conversion between a video picture of a video and a bitstream of the video. The conversion comprises performing a deblocking filtering operation in which at least some samples of reconstructed video blocks are selectively filtered using a deblocking filter whose parameters are indicated. A first syntax element in a first video unit level specifying a deblocking parameter offset for β divided by 2 applied to a chroma component for one or more slices in a first video unit and a second syntax element in the first video unit level specifying a deblocking parameter offset for tC divided by 2 applied to the chroma component for the one or more slices in the first video unit are determined according to a rule in response to the first syntax element and the second syntax element not included in the bitstream. The rule specifies that (1) in case a syntax flag indicating that chroma tool offsets are present in a picture parameter set, the first syntax element is equal to a third syntax element in a second video unit level specifying a deblocking parameter offset for β divided by 2 applied to a chroma component associated with a second video unit, and the second syntax element is equal to a fourth syntax element in the second video unit level specifying a deblocking parameter offset for tC divided by 2 applied to the chroma component associated with the second video unit, and (2) in case the syntax flag indicating that the chroma tool offsets are not present in the picture parameter set, the first syntax element is equal to a fifth syntax element in the first video unit level specifying a deblocking parameter offset for β divided by 2 applied to a luma component for the one or more slices in the first video unit, and the second syntax element is equal to a sixth syntax element in the first video unit level specifying a deblocking parameter offset for tC divided by 2 applied to the luma component for the one or more slices in the first video unit.

In some embodiments, the chroma component is a cb component. In some embodiments, the chroma component is a cr component. In some embodiments, the first video unit level is a picture header, and the second video unit level is a picture parameter set. In some embodiments, the first video unit is a picture, and the second video unit comprises one or more pictures. In some embodiments, the first video unit level is a slice header, and the second video unit level is a picture header. In some embodiments, the first video unit is a slice, and the second video unit is a picture.

In some embodiments, the syntax flag is equal to 1 in response to the chroma tool offsets being present in the picture parameter set. In some embodiments, the syntax flag is equal to 0 in response to the chroma tool offsets being omitted in the picture parameter set.

In some embodiments, the conversion comprises encoding the video into the bitstream. In some embodiments, the conversion comprises decoding the video from the bitstream.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A video processing method, comprising:
performing a conversion between a video picture of a video and a bitstream of the video,
wherein the conversion comprises performing a deblocking filtering operation in which at least some samples of reconstructed video blocks are selectively filtered using a deblocking filter whose parameters are indicated,
wherein a first syntax element in a first video unit level specifying a deblocking parameter offset for $\beta$ divided by 2 applied to a chroma component for one or more slices in a first video unit and a second syntax element in the first video unit level specifying a deblocking parameter offset for tC divided by 2 applied to the chroma component for the one or more slices in the first video unit are determined according to a rule in response to the first syntax element and the second syntax element not included in the bitstream,
wherein the rule specifies that (1) in case a syntax flag indicating that chroma tool offsets are present in a picture parameter set, the first syntax element is equal to a third syntax element in a second video unit level specifying the deblocking parameter offset for $\beta$ divided by 2 applied to a chroma component associated with a second video unit, and the second syntax element is equal to a fourth syntax element in the second video unit level specifying the deblocking parameter offset for tC divided by 2 applied to the chroma component associated with the second video unit, and (2) in case the syntax flag indicating that the chroma tool offsets are not present in the picture parameter set, the first syntax element is equal to a fifth syntax element in the first video unit level specifying the deblocking parameter offset for $\beta$ divided by 2 applied to a luma component for the one or more slices in the first video unit, and the second syntax element is equal to a sixth syntax element in the first video unit level specifying the deblocking parameter offset for tC divided by 2 applied to the luma component for the one or more slices in the first video unit, wherein the first video unit level is a picture header, and wherein the second video unit level is the picture parameter set, and wherein the first syntax element specifies the deblocking parameter offset for β divided by 2 applied to a chroma component for slices in a current picture and the second syntax element specifies the deblocking parameter offset for tC divided by 2 applied to the chroma component for slices in the current picture.

2. The method of claim 1, wherein the chroma component is a cb component.

3. The method of claim 1, wherein the chroma component is a cr component.

4. The method of claim 1, wherein the first video unit is a picture, and wherein the second video unit comprises one or more pictures.

5. The method of claim 1, wherein the syntax flag is equal to 1 in response to the chroma tool offsets being present in the picture parameter set.

6. The method of claim 1, wherein the syntax flag is equal to 0 in response to the chroma tool offsets being omitted in the picture parameter set.

7. The method of claim 1, wherein the conversion comprises encoding the video into the bitstream.

8. The method of claim 1, wherein the conversion comprises decoding the video from the bitstream.

9. An apparatus for processing video data comprising a processor and a non-transitory memory with instructions thereon, wherein the instructions upon execution by the processor, cause the processor to:

perform a conversion between a video picture of a video and a bitstream of the video, wherein the conversion comprises performing a deblocking filtering operation in which at least some samples of reconstructed video blocks are selectively filtered using a deblocking filter whose parameters are indicated, wherein a first syntax element in a first video unit level specifying a deblocking parameter offset for β divided by 2 applied to a chroma component for one or more slices in a first video unit and a second syntax element in the first video unit level specifying a deblocking parameter offset for tC divided by 2 applied to the chroma component for the one or more slices in the first video unit are determined according to a rule in response to the first syntax element and the second syntax element not included in the bitstream, wherein the rule specifies that (1) in case a syntax flag indicating that chroma tool offsets are present in a picture parameter set, the first syntax element is equal to a third syntax element in a second video unit level specifying the deblocking parameter offset for β divided by 2 applied to a chroma component associated with a second video unit, and the second syntax element is equal to a fourth syntax element in the second video unit level specifying the deblocking parameter offset for tC divided by 2 applied to the chroma component associated with the second video unit, and (2) in case the syntax flag indicating that the chroma tool offsets are not present in the picture parameter set, the first syntax element is equal to a fifth syntax element in the first video unit level specifying the deblocking parameter offset for β divided by 2 applied to a luma component for the one or more slices in the first video unit, and the second syntax element is equal to a sixth syntax element in the first video unit level specifying the deblocking parameter offset for tC divided by 2 applied to the luma component for the one or more slices in the first video unit, wherein the first video unit level is a picture header, and wherein the second video unit level is the picture parameter set, and wherein the first syntax element specifies the deblocking parameter offset for β divided by 2 applied to a chroma component for slices in a current picture and the second syntax element specifies the deblocking parameter offset for tC divided by 2 applied to the chroma component for slices in the current picture.

10. The apparatus of claim 9, wherein the first video unit is a picture, and wherein the second video unit comprises one or more pictures.

11. The apparatus of claim 9, wherein the syntax flag is equal to 1 in response to the chroma tool offsets being present in the picture parameter set.

12. The apparatus of claim 9, wherein the syntax flag is equal to 0 in response to the chroma tool offsets being omitted in the picture parameter set.

13. A non-transitory computer-readable storage medium storing instructions that cause a processor to:

perform a conversion between a video picture of a video and a bitstream of the video, wherein the conversion comprises performing a deblocking filtering operation in which at least some samples of reconstructed video blocks are selectively filtered using a deblocking filter whose parameters are indicated, wherein a first syntax element in a first video unit level specifying a deblocking parameter offset for β divided by 2 applied to a chroma component for one or more slices in a first video unit and a second syntax element in the first video unit level specifying a deblocking parameter offset for tC divided by 2 applied to the chroma component for the one or more slices in the first video unit are determined according to a rule in response to the first syntax element and the second syntax element not included in the bitstream, wherein the rule specifies that (1) in case a syntax flag indicating that chroma tool offsets are present in a picture parameter set, the first syntax element is equal to a third syntax element in a second video unit level specifying the deblocking parameter offset for β divided by 2 applied to a chroma component associated with a second video unit, and the second syntax element is equal to a fourth syntax element in the second video unit level specifying the deblocking parameter offset for tC divided by 2 applied to the chroma component associated with the second video unit, and (2) in case the syntax flag indicating that the chroma tool offsets are not present in the picture parameter set, the first syntax element is equal to a fifth syntax element in the first video unit level specifying the deblocking parameter offset for β divided by 2 applied to a luma component for the one or more slices in the first video unit, and the second syntax element is equal to a sixth syntax element in the first video unit level specifying the deblocking parameter offset for tC divided by 2 applied to the luma component for the one or more slices in the first video unit, wherein the first video unit level is a picture header, and wherein the second video unit level is the picture parameter set, and wherein the first syntax element specifies the deblocking parameter offset for β divided by 2 applied to a chroma component for slices in a current picture and the second syntax element specifies the deblocking parameter offset for tC divided by 2 applied to the chroma component for slices in the current picture.

14. The non-transitory computer-readable storage medium of claim 13, wherein the first video unit is a picture, and wherein the second video unit comprises one or more pictures.

15. The non-transitory computer-readable storage medium of claim 13, wherein the syntax flag is equal to 1 in response to the chroma tool offsets being present in the picture parameter set.

16. The non-transitory computer-readable storage medium of claim 13, wherein the syntax flag is equal to 0 in response to the chroma tool offsets being omitted in the picture parameter set.

17. A method for storing a bitstream of a video, comprising:

generating, for a video picture of the video, the bitstream of the video; and storing the bitstream in a non-transitory computer-readable recording medium, wherein the generating comprises performing a deblocking filtering operation in which at least some samples of reconstructed video blocks are selectively filtered using a deblocking filter whose parameters are indicated, wherein a first syntax element in a first video unit level specifying a deblocking parameter offset for β divided by 2 applied to a chroma component for one or more slices in a first video unit and a second syntax element in the first video unit level specifying a deblocking parameter offset for tC divided by 2 applied to the chroma component for the one or more slices in the first video unit are determined according to a rule in response to the first syntax element and the second syntax element not included in the bitstream, wherein the rule specifies that (1) in case a syntax flag indicating that chroma tool offsets are present in a picture parameter set, the first syntax element is equal to a third syntax element in a second video unit level specifying the deblocking parameter offset for β divided by 2 applied to a chroma component associated with a second video unit, and the second syntax element is equal to a fourth syntax element in the second video unit level specifying the deblocking parameter offset for tC divided by 2 applied to the chroma component associated with the second video unit, and (2) in case the syntax flag indicating that the chroma tool offsets are not present in the picture parameter set, the first syntax element is equal to a fifth syntax element in the first video unit level specifying the deblocking parameter offset for β divided by 2 applied to a luma component for the one or more slices in the first video unit, and the second syntax element is equal to a sixth syntax element in the first video unit level specifying the deblocking parameter offset for tC divided by 2 applied to the luma component for the one or more slices in the first video unit, wherein the first video unit level is a picture header, and wherein the second video unit level is the picture parameter set, and wherein the first syntax element specifies the deblocking parameter offset for β divided by 2 applied to a chroma component for slices in a current picture and the second syntax element specifies the deblocking parameter offset for tC divided by 2 applied to the chroma component for slices in the current picture.

18. The method of claim 17, wherein the first video unit is a picture, and wherein the second video unit comprises one or more pictures.

19. The method of claim 17, wherein the syntax flag is equal to 1 in response to the chroma tool offsets being present in the picture parameter set.

20. The method of claim 17, wherein the syntax flag is equal to 0 in response to the chroma tool offsets being omitted in the picture parameter set.

* * * * *